US012405575B2

(12) United States Patent
Lechot

(10) Patent No.: US 12,405,575 B2
(45) Date of Patent: Sep. 2, 2025

(54) HOROLOGICAL RESONATOR MECHANISM EQUIPPED WITH INERTIAL ELEMENT STOPPING MEANS

(71) Applicant: The Swatch Group Research and Development Ltd, Marin (CH)

(72) Inventor: Dominique Lechot, Les Reussilles (CH)

(73) Assignee: The Swatch Group Research and Development Ltd, Marin (CH)

( * ) Notice: Subject to any disclaimer, the term of this patent is extended or adjusted under 35 U.S.C. 154(b) by 481 days.

(21) Appl. No.: 17/816,010

(22) Filed: Jul. 29, 2022

(65) Prior Publication Data

US 2023/0062088 A1 Mar. 2, 2023

(30) Foreign Application Priority Data

Aug. 27, 2021 (EP) .................................... 21193559

(51) Int. Cl.
*G04B 17/32* (2006.01)

(52) U.S. Cl.
CPC .................................. *G04B 17/32* (2013.01)

(58) Field of Classification Search
None
See application file for complete search history.

(56) References Cited

U.S. PATENT DOCUMENTS 3,111,807 A * 11/1963 Cloux ...................... G04C 3/04
968/466

FOREIGN PATENT DOCUMENTS

| | | | | |
|---|---|---|---|---|
| CH | 704 783 A1 | 10/2012 | | |
| EP | 2697693 A1 * | 2/2014 | .......... | G04B 17/285 |
| EP | 3561607 A1 * | 10/2019 | ............ | G04B 17/00 |

OTHER PUBLICATIONS

European Search Report Issued Jan. 21, 2022 in European Application 21193559.8 Filed on Aug. 27, 2021 (with English Translation of Categories of Cited Documents), 3 pages.
Japanese Office Action issued Aug. 15, 2023 in Japanese Application 2022-123203 (with English translation), 5 pages.

* cited by examiner

*Primary Examiner* — Regis J Betsch
*Assistant Examiner* — Michael James Walker
(74) *Attorney, Agent, or Firm* — Oblon, McClelland, Maier &Neustadt, L.L.P.

(57) ABSTRACT

A horological resonator mechanism includes a structure and an anchoring unit from which at least one inertial element arranged to oscillate along a first degree of freedom in rotation about a pivoting axis extending along a first direction is suspended. The inertial element is subjected to return forces that make the inertial element oscillate. The mechanism includes a stopper to stop the inertial element that can be actuated on demand to prevent the oscillations of the inertial element. The stopper moves the inertial element between a pivoting position and a stopping position in which the inertial element cannot oscillate.

17 Claims, 3 Drawing Sheets

HOROLOGICAL RESONATOR MECHANISM EQUIPPED WITH INERTIAL ELEMENT STOPPING MEANS

CROSS-REFERENCE TO RELATED APPLICATION

The present application claims priority to European Patent Application No. 21193559.8, filed on Aug. 27, 2021, the entire content and disclosure of which are incorporated by reference herein.

FIELD OF THE INVENTION

The invention relates to a horological resonator mechanism equipped with inertial element stopping means.

The invention further relates to a horological movement including at least one such resonator mechanism and/or a horological oscillator including at least one such resonator mechanism.

BACKGROUND OF THE INVENTION

In horological movement oscillation mechanisms, means for stopping the balance are generally used to prevent it from oscillating, for example when it is sought to set the time of the movement. These stopping means are configured to lock the movement of the balance by contact therewith.

Balances generally have an annular shape, and the stopping means comprise a mobile banking which comes into contact with the periphery of the balance to stop it, when they are actuated. In tourbillons, there are other types of stopping means acting upon the rotational shaft of the balance to stop the movement thereof, for example by locking a counter-banking arranged on the rotational shaft.

However, there are other types of balances, which are not necessarily annular, or which have no rotational shaft about which they rotate. For example, in the case of flexible-guidance oscillators, the inertial element can be equipped with an elongated body, which oscillates by means of one, or preferably several flexible strips.

Thus, existing stopping means are not satisfactory on such oscillators, and novel stopping means are required.

SUMMARY OF THE INVENTION

The invention proposes to devise novel stopping means capable of functioning with any type of inertial element, but also with annular inertial elements conventionally used in horological oscillators.

For this purpose, the invention relates to a horological resonator mechanism, including a structure and an anchoring unit from which at least one inertial element arranged to oscillate along a first degree of freedom in rotation RZ about a pivoting axis extending along a first direction Z is suspended, said inertial element being configured to be subjected to return forces exerted by return means configured to make the inertial element oscillate, the mechanism including means for stopping the inertial element that can be actuated on demand to prevent the oscillations of the inertial element.

The oscillator mechanism is remarkable in that the stopping means are configured to move the inertial element between a pivoting position and a stopping position wherein the inertial element cannot oscillate.

Thus, the inertial element is not only mobile in rotation to be able to oscillate, but also in translation to set it to a position wherein it is locked and can no longer oscillate.

This novel type of stopping means avoids having to account for the geometry of the inertial element. They can be adapted to specific oscillating systems, for example with flexible guidance, which do not comprise an annular balance, but an elongated inertial element. Furthermore, these stopping means can also be used for routine annular balances.

According to a specific embodiment of the invention, the stopping means comprise a stopping banking against which the inertial element is in contact in the stopping position, the inertial element no longer being in contact with the stopping banking in the pivoting position.

According to a specific embodiment of the invention, the inertial element is mobile in translation against the stopping banking.

According to a specific embodiment of the invention, the stopping means are configured to push the inertial element against the stopping banking.

According to a specific embodiment of the invention, the inertial element is configured to oscillate at least partially about a first pivoting blom stud of the structure, the first pivoting blom stud being configured to enable the pivoting of the inertial element about an axis passing through the first pivoting blom stud.

According to a specific embodiment of the invention, the first pivoting blom stud comprises the stopping banking.

According to a specific embodiment of the invention, the inertial element is configured to slide along the first pivoting blom stud to come into contact with the stopping banking.

According to a specific embodiment of the invention, the stopping means include actuation means arranged to move the inertial element against the stopping banking.

According to a specific embodiment of the invention, the actuation means comprise a support body configured to push the inertial element.

According to a specific embodiment of the invention, the actuation means comprise a lever configured to exert a force on the support body, so as to move the inertial element.

According to a specific embodiment of the invention, the support body is flexible.

According to a specific embodiment of the invention, the lever is configured to lift said support body to move the inertial element.

According to a specific embodiment of the invention, the actuation means comprise a mobile winding-mechanism rod to actuate the lever.

According to a specific embodiment of the invention, the return means comprise a flexible pivot including a plurality of substantially longitudinal elastic strips, each fastened, at a first end to said anchoring unit, and at a second end to said inertial element, each said elastic strip being deformable essentially in a plane XY perpendicular to said first direction Z.

The invention further relates to a horological movement including at least one such resonator mechanism and/or a horological oscillator including at least one such resonator mechanism.

BRIEF DESCRIPTION OF THE DRAWINGS

Further features and advantages of the present invention will emerge on reading the following detailed description, with reference to the appended figures, wherein.

DETAILED DESCRIPTION OF PREFERRED EMBODIMENTS

The invention relates to a horological resonator mechanism, which represents for example a variant of the resonators described in application CH00518/18 or application EP18168765.8 on behalf of ETA Manufacture Horlogère Suisse, incorporated here by reference, and wherein a person skilled in the art would be able to combine the features with those specific to the present invention.

Figure 1:
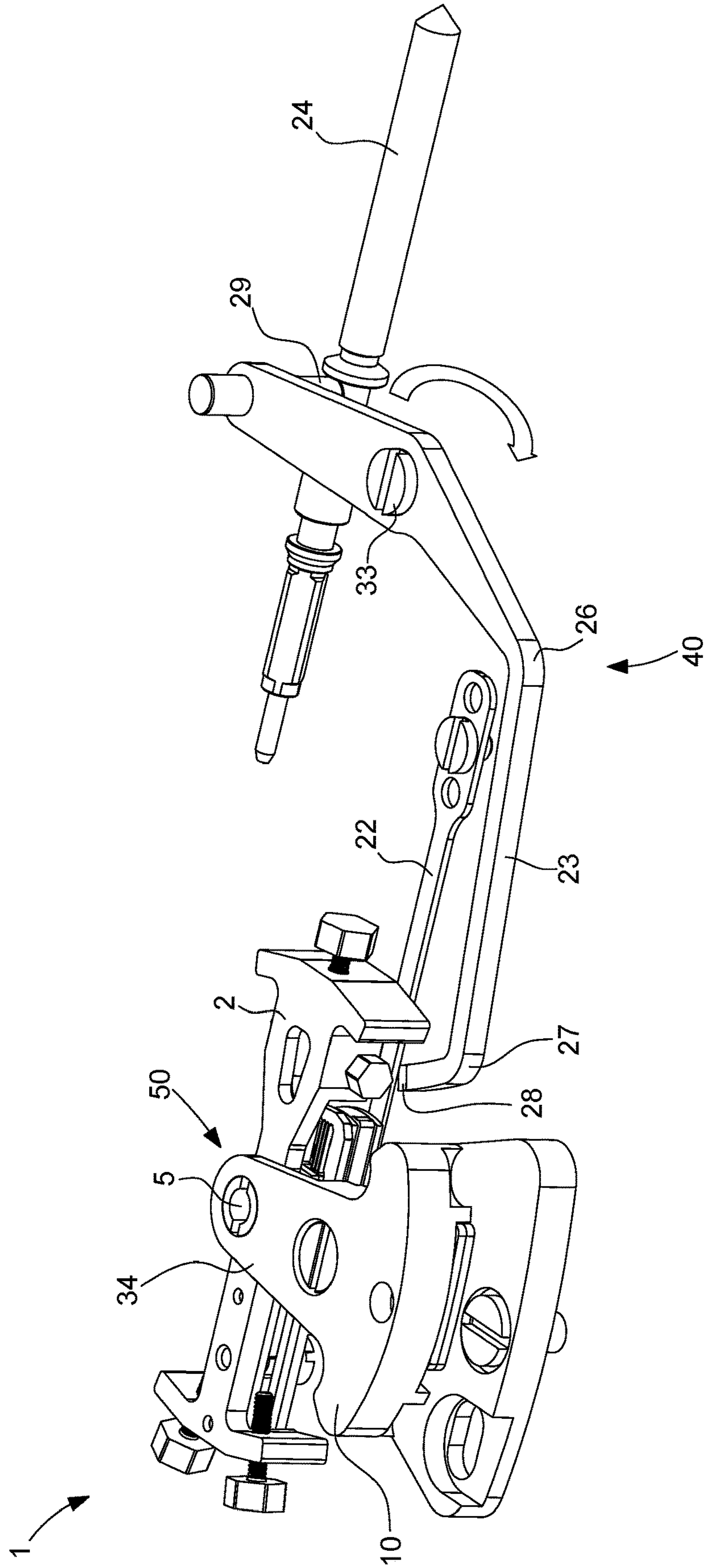
FIG. 1 represents, schematically, and in a perspective view, a flexible strip resonator mechanism including means for stopping the inertial element, as well as means for actuating the stopping means.
Figure 2:
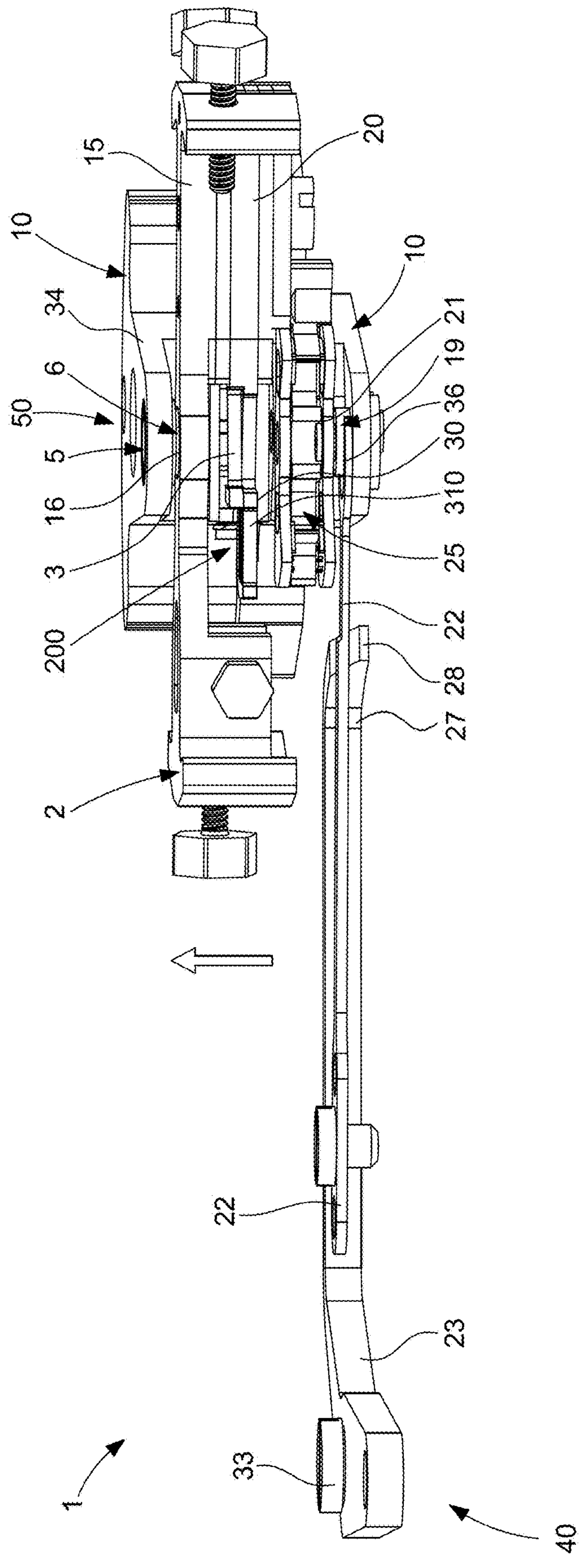
FIG. 2 represents, schematically, and in a side view, the resonator mechanism in FIG. 1.
Figure 3:
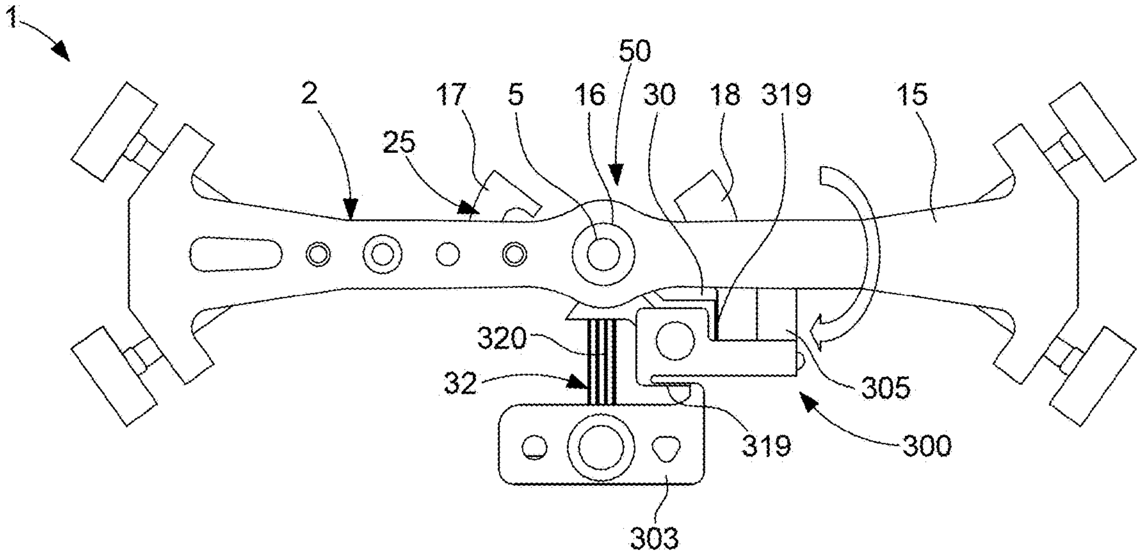
FIG. 3 represents, schematically, and in a top view, the resonator mechanism in FIGS. 1 and 2, wherein the structure and the stopping means have been deposited.

In FIGS. 1 and 2, this horological resonator mechanism 1 includes a structure 10 and an anchoring unit 30, from which is suspended at least one inertial element 2 arranged to oscillate along a first degree of freedom in rotation RZ about a pivoting axis D extending along a first direction Z.

The inertial element 2 is subjected to return forces exerted by return means. In the embodiment, the return means are a flexible pivot 200 including a plurality of substantially longitudinal elastic strips 3, each fastened, at a first end to the anchoring unit 30, and at a second end to the inertial element 2. In the figures, the resonator mechanism 1 includes two crossed elastic strips 3, each strip 3 being equipped with a plurality of ribs on either side on each face of the strip 3. An elastic strip 3 is deformable essentially in a plane XY perpendicular to the first direction Z.

Thanks to the return means, the inertial element 2 can oscillate in the plane XY, the first direction Z being perpendicular to the plane XY.

The inertial element 2 comprises an attachment 20 whereon the elastic strips 3 are fastened. The inertial element 2 further comprises a balance 15 assembled with the attachment 20. The balance 15 is elongated in a substantially symmetrical bone shape.

The inertial element 2 is configured to oscillate at least partially about a first pivoting blom stud 5 of the structure 10, the pivoting blom stud 5 being configured to enable the pivoting of the inertial element 2 about it. For this purpose, the balance 15 comprises a central hole 16 to insert the first pivoting blom stud 5. The central hole 16 has a wider diameter than the first blom stud 5 in order to enable the balance 15 to rotate about it.

The inertial element 2 further comprises a pallet assembly 25 assembled under the attachment 20, the pallet assembly 25 being centred on the balance 20 and the central hole 16. The pallet assembly 25 comprises two arms 17, 18 in arcs of a circle wherein the ends are configured to cooperate with an escapement wheel, not shown in the figures. The escapement can be mechanical type or magnetic type.

A second pivoting blom stud 19 of the structure 10 is inserted into the pallet assembly 25 along the axis of rotation of the inertial element 2. The pallet assembly 25 comprises a second hole 21 wherein the second blom stud 19 is inserted, the second hole 21 being wider than the second blom stud 19 to avoid any contact between the pallet assembly 25 and the second hole 21. The second blom stud 19 is arranged in the axis of the first blom stud 5. Thus, the inertial element 2 surrounds the first 5 and the second blom stud 19, which are inserted, one in the balance 15 and the other in the pallet assembly 25, so as to enable the oscillation of the inertial element 2 along an axis of rotation passing through the two blom studs 5, 19. The oscillation amplitude of the inertial element 2 in the oscillation plane is for example within an interval ranging from 20 to 40°. The oscillation frequency is for example greater than ten Hz.

The second blom stud 19 has a vertical banking function along the direction Z, in the event of shock, to prevent the elastic strips 3 or strips of the translation platforms 31, 32 from breaking. The second blom stud 19 has an outgrowth or a widening at the base thereof to retain the inertial element 2. Thus, if the mechanism is shaken violently, the movement of the inertial element 2 is limited along the direction Z by the second blom stud 19.

According to the invention, the mechanism includes stopping means 50 of the inertial element 2, which can be actuated on demand to prevent the oscillations of the inertial element 2. The stopping means 50 are configured to move the inertial element 2 between a pivoting position wherein it can oscillate freely, and a stopping position wherein the inertial element 2 cannot oscillate because it is constrained.

For this purpose, the resonator mechanism 1 comprises a stopping banking 6 against which the inertial element 2 comes into contact in the stopping position in order to prevent any oscillation. The first blom stud 5 comprises the stopping banking 6, which is for example formed from an additional thickness at the periphery thereof, or from a widening of the blom stud 5 at the base thereof.

The inertial element 2 is thus configured to slide along the pivoting blom stud 5 to come into contact with the banking 6, when it is sought to stop its oscillations. To move the mobile element 2, which is mobile in translation along the direction Z, the mobile element 2 is pushed by inducing a force under the pallet assembly 25. The flexibility of the two elastic strips 3 enables the movement of the inertial element 2 along the direction Z without any risk of wear or damage of the strips 3. The movement of the inertial element 2 is performed over a very short distance to avoid substantial deflection of the elastic strips 3. The mobile element 2 comes into contact with the banking 6 which is located above it along the direction Z. Thus, the stopping means 50 are configured to push the mobile element 2 against this stopping banking 6.

For this purpose, the stopping means 50 include actuation means 40 arranged to push the inertial element 2 against the stopping banking 6. The actuation means 40 comprise a support body 22, configured to be capable of being engaged with the inertial element 2, the support body 22 serving as means for moving the inertial element 2. The support body 22 is elongated to be capable of being actuated remotely.

Furthermore, the support body 22 is equipped on one end with a fork 36 surrounding the second blom stud 19, so as to be capable of sliding along said second blom stud 19. In the pivoting position, the support body 22 and the fork 36 are not in contact with the inertial element 2.

To move the inertial element 2, the support body 22 is mobile along the second blom stud 19 to be able to come into contact with the inertial element 2, and push it to the stopping banking 6. Thus, in the stopping position, the support body 22 and the fork 36 are in contact with the inertial element 2.

In the figures, the support body 22 is for example a sheet, preferably metallic, equipped with the fork 36 at the end thereof to grip the second blom stud 19 arranged under the pallet assembly 25.

Preferably, the support body 22 is flexible to be able to apply a force with precision. When a force is applied on the sheet, it bends, but transmits some of the force under the inertial element 2, in order to lift it.

The actuation means 40 produce a thrust along the axis of rotation of the inertial element 2, perpendicularly thereto. Preferably, the support body 22 is arranged parallel with the inertial element 2.

The actuation means 40 comprise a lever 23 configured to bear against said support body 22 to move the inertial element 2. The lever 23 comprises an elongated body of which a part presses under the support body 22 in order to push it upwards when the actuation means 40 are actuated.

The actuation means 40 further comprise a winding-mechanism rod 24 to actuate the lever 23. The rod 24 has a cylindrical shape and can be moved along the longitudinal axis thereof when it is actuated.

The lever 23 here has a bent arm shape, with a first bend 26 in the middle of the lever 23 and a second bend 27 before a free end 28. The free end is in contact with the support body 22. The free end 28 has a triangular shape tapering towards the end. The free end 28 is positioned under the support body 22. Thus, by moving the free end 28 under the support body 22, the support body 22 is lifted by a thicker portion of the free end 28.

The lever 23 comprises a second end 29 in contact with the rod 24, the second end 29 being retained between two guiding ribs 31, 32 extending about the rod 24. Thus, when the rod 24 is actuated, by pulling it or pushing it along the axis thereof, the second end 29 is pulled or pushed.

The lever 23 comprises a pivot 33 about which it can rotate, the pivot 33 being formed from a screw passing through the lever 23. Thus, when the rod 24 is pulled, the second end follows the movement of the rod 24, such that the lever 23 rotates about the pivot 33. Thus, the free end 28 slides under the support body 22 to lift it. The inertial element 2 is then itself lifted, and comes into contact with the stopping banking 6, which locks the oscillatory movement thereof.

Figure 4:
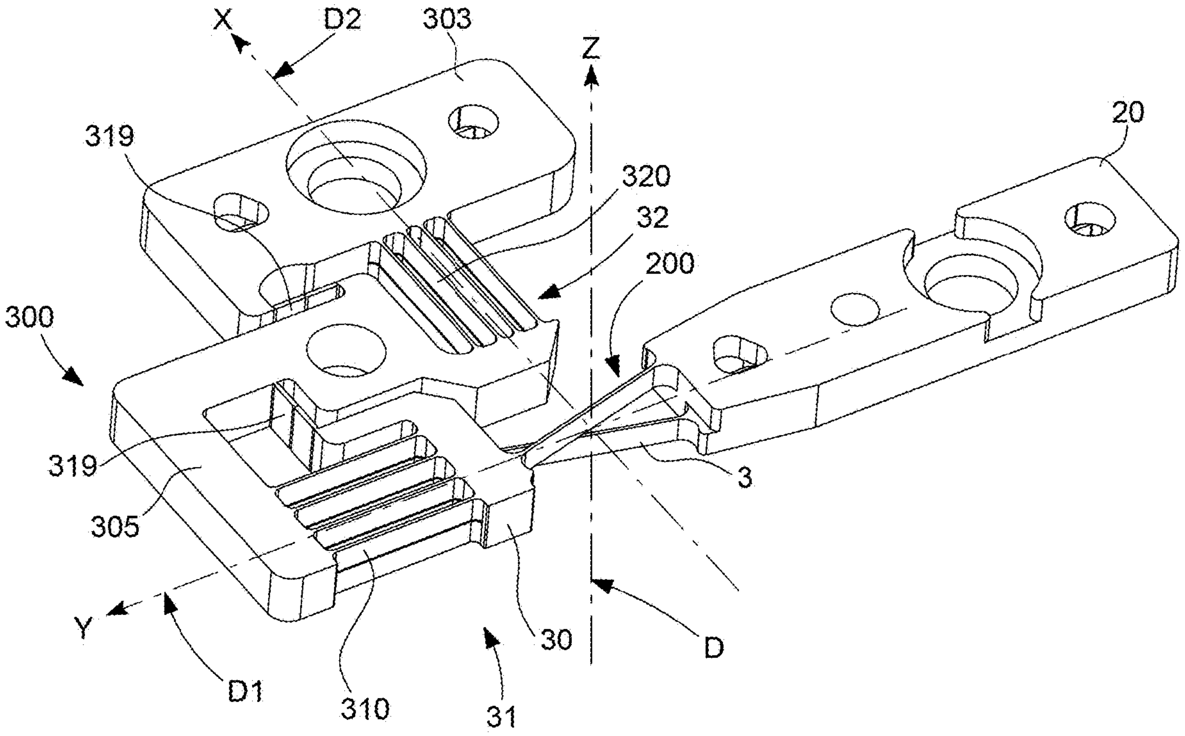
FIG. 4 represents, schematically, and in a perspective view, a part of an inertial mass suspended from an anchoring unit by a flexible pivot.

In FIG. 4, the anchoring unit 30 is suspended from the structure 10 by a flexible suspension 300, which is arranged to allow the mobility of the anchoring unit 30 along five flexible degrees of freedom of the suspension which are:

- a first degree of freedom in translation along the first direction Z,
- a second degree of freedom in translation along a second direction X orthogonal to the first direction Z,
- a third degree of freedom in translation along a third direction Y orthogonal to the second direction X and to the first direction Z,
- a second degree of freedom in rotation RX about an axis extending along the second direction X,
- and a third degree of freedom in rotation RY about an axis extending along the third direction Y.

The flexible suspension 300 includes, between the anchoring unit 30 and a first intermediate mass 303, which is fastened to the structure 10 directly or by means of a flexible plate 319 along the first direction Z, a transverse translation platform 32 with flexible guidance, and which includes rectilinear transverse strips 320, extending along the second direction X and symmetrical about a transverse axis D2 intersecting the pivoting axis D.

The flexible suspension 300 further includes, between the anchoring unit 30 and a second intermediate mass 305, a longitudinal translation platform 31 with flexible guidance, and which includes rectilinear longitudinal strips 310, extending along the third direction Y and symmetrical about a longitudinal axis D1 intersecting the pivoting axis D. And, between the second intermediate mass 305 and the first intermediate mass 303, the transverse translation platform 32 with flexible guidance includes rectilinear transverse strips 320, extending along the second direction X and symmetrical about the transverse axis D2 intersecting the pivoting axis D.

The longitudinal axis D1 intersects the transverse axis D2, and in particular the longitudinal axis D1, the transverse axis D2, and the pivoting axis D are concurrent.

The longitudinal translation platform 31 and the transverse translation platform 32 each include at least two strips, each strip being characterised by the thickness thereof along said second direction X when the strip or rod extends along the third direction Y or vice versa, by the height thereof along said first direction Z, and by the length thereof along the direction along which said strip or rod extends, the length being at least five times greater than the height, the height being at least as great as the thickness, and more particularly at least five times greater than this thickness, and even more particularly at least seven times greater than this thickness.

The transverse translation platform 32 includes at least two transverse flexible strips, parallel with one another and of the same length. In the embodiment in the figures, the translation platforms have four flexible strips.

The invention further relates to a horological oscillator mechanism including such a horological resonator mechanism 1, and an escapement mechanism, not shown in the figures, which are arranged to cooperate with one another.

The invention further relates to a horological movement 10 including at least one such oscillator mechanism and/or at least one resonator mechanism 1.

Obviously, the present invention is not limited to the example illustrated but is suitable for various variants and modifications which will be obvious to those skilled in the art. In the embodiment described, the inertial element 2 is lifted, but other embodiments are possible, for example an embodiment wherein the inertial element is retained in the pivoting position, and which slides downwards in a stopping position. As regards the return means, a balance-spring can be used instead of the pivot with flexible strips.

The invention claimed is:

1. A horological resonator mechanism, comprising: a structure and an anchoring unit from which at least one inertial element arranged to oscillate along a first degree of freedom in rotation about a pivoting axis extending along a first direction is suspended, said inertial element being configured to be subjected to return forces exerted by return means configured to make the inertial element oscillate; and means for stopping the inertial element that are configured to be actuated on demand to prevent the oscillations of the inertial element, wherein the stopping means are configured to rotate to move the inertial element in translation between a pivoting position and a stopping position wherein the inertial element cannot oscillate, wherein the stopping means comprise a stopping banking against which the inertial element is in contact in the stopping position, the inertial element no longer being in contact with the stopping banking in the pivoting position, and wherein the stopping means are configured to rotate to move the inertial element in translation against the stopping banking in the stopping position.

2. The horological resonator mechanism according to claim 1, wherein the inertial element is configured to oscillate at least partially about a first pivoting blom stud of the structure, the first pivoting blom stud being configured to enable the pivoting of the inertial element about an axis passing through said first pivoting blom stud.

3. The horological resonator mechanism according to claim 2, wherein the first pivoting blom stud comprises the stopping banking.

4. The horological resonator mechanism according to claim 3, wherein the inertial element is configured to slide along the first pivoting blom stud to come into contact with the stopping banking.

5. The horological resonator mechanism according to claim 1, wherein the stopping means include actuation means arranged to move the inertial element against the stopping banking.

6. The horological resonator mechanism according to claim 5, wherein the actuation means comprise a support body configured to push the inertial element.

7. The horological resonator mechanism according to claim 6, wherein the support body is flexible.

8. The horological resonator mechanism according to claim 6, wherein the actuation means comprise a lever configured to exert a force on the support body, so as to move the inertial element.

9. The horological resonator mechanism according to claim 8, wherein the lever is configured to lift said support body to move the inertial element.

10. The horological resonator mechanism according to claim 8, wherein the actuation means comprise a mobile winding-mechanism rod to actuate the lever.

11. The horological resonator mechanism according to claim 1, wherein the return means comprise a flexible pivot including a plurality of substantially longitudinal elastic strips, each fastened, at a first end to said anchoring unit, and at a second end to said inertial element, each said elastic strip being deformable essentially in a plane perpendicular to said first direction.

12. A horological movement, comprising:
at least one of the horological resonator mechanism according to claim 1.

13. A horological oscillator mechanism, comprising:
at least one of the horological resonator mechanism according to claim 1.

14. A horological resonator mechanism, comprising:
an inertial element including a balance;
a structure and an anchoring unit including a pivoting blom stud mounted in the balance, wherein the inertial element is configured to pivot about the pivoting blom stud to oscillate along a first degree of freedom in rotation about a pivoting axis extending along a first direction, said inertial element being configured to be subjected to return forces configured to oscillate the inertial element; and
an actuator including a support body configured to contact the inertial element to move the inertial element in translation along the pivoting axis to a stopping position wherein the inertial element cannot oscillate.

15. The horological resonator mechanism according to claim 14, wherein the pivoting blom stud includes a widened portion such that, when the inertial element is moved in translation to the stopping position, the inertial element contacts the widened portion of the pivoting blom stud to prevent the inertial element from oscillating.

16. The horological resonator mechanism according to claim 14, wherein the actuator includes a lever configured to rotate around a lever pivot such that a first end of the lever contacts the support body to move the inertial element in translation along the pivoting axis to the stopping position.

17. The horological resonator mechanism according to claim 16, wherein a second end of the lever is contacted by a rod to rotate the lever around the lever pivot.

* * * * *